United States Patent [19]
Pritt

[11] Patent Number: 5,542,032
[45] Date of Patent: Jul. 30, 1996

[54] FAST DISPLAY OF IMAGES OF THREE-DIMENSIONAL SURFACES WITHOUT ALIASING

[75] Inventor: Mark D. Pritt, Frederick, Md.

[73] Assignee: Loral Federal Systems Company, McLean, Va.

[21] Appl. No.: 131,357

[22] Filed: Oct. 4, 1993

[51] Int. Cl.$^6$ ............................................. G06T 15/10
[52] U.S. Cl. ............................................ 395/121; 395/119
[58] Field of Search .......................... 395/119, 121–126, 395/161–163, 130; 358/518

[56] References Cited

U.S. PATENT DOCUMENTS

| | | | |
|---|---|---|---|
| 4,821,210 | 4/1989 | Rumbaugh | 364/518 |
| 4,821,212 | 4/1989 | Heartz | 364/521 |
| 4,847,789 | 7/1989 | Kelly et al. | 395/121 |
| 5,101,475 | 4/1989 | Kaufman et al. | 395/124 |
| 5,175,806 | 12/1992 | Muskovitz et al. | 395/125 |
| 5,179,638 | 1/1993 | Dawson et al. | 395/125 |
| 5,201,030 | 4/1993 | Carrie | 395/132 |
| 5,222,204 | 6/1993 | Swanson | 395/127 |
| 5,282,262 | 1/1994 | Kurashige | 395/126 |
| 5,313,568 | 5/1994 | Wallace et al. | 395/126 |

FOREIGN PATENT DOCUMENTS 2-54   2/1990   Japan .

OTHER PUBLICATIONS

Shepard, Terry et al, Real–time Hidden Surface Removal in a Flight Simulator, Communications, Computers and Signal Processing, pp. 607–610, (1991).

Frieder, O. et al, Dynamic Hidden Surfaces Using a MIMD Multiprocessor, Computer–Based Medical Systems, pp. 44–51, (1990).

Wang, Sue–Ling Chen et al, Visibility Determination on Projected Grid Surfaces, IEEE Graphics and Applications Magazine, pp. 36–43, (1990).

Fast Perspective Views of Images Using One Dimensional Operations, P. K. Robertson, Feb. 1937, IEEE Computer Graphics and Applications.

Foley, et al. *Fundamentals of Computer Graphics*, 2nd Addison–Wesley Pub Co (1990).

*Primary Examiner*—Mark K. Zimmerman
*Assistant Examiner*—Rudolph J. Buchel
*Attorney, Agent, or Firm*—John D. Flynn; Ronald L. Drumheller; Mark A. Wurm

[57] ABSTRACT

A method and system for generating an anti-aliased image of a three dimensional surface is described. A point of view of the display screen is specified by an azimuth angle and an elevation angle with respect to the three-dimensional surface. The surface is defined as a two-dimensional array of height values. The projection of a point of the surface to the display plane is performed by applying a rotation based on the azimuth and elevation angles, followed by a parallel projection to the display plane so that, the columns of the surface project to the columns of the display screen. The points of the surface are projected in pairs, starting with the nearest points within a column and proceeding to the farthest points of the column. The grey-level shading (or color) values are accumulated in a one-dimensional array of floating-point variables that store the intensities of the pixels of a column of the display screen. The intensities are accumulated by weighting the grey-level shades (or colors) by the distance between the projected pair of points and by the fractional offsets from the integer-valued pixel locations. Because the grey-level shade of every grid point of the surface contributes to the pixel intensities, aliasing effects within columns of pixels are avoided. Aliasing effects across columns are avoided by the use of intermediate scan lines between the columns of pixels.

22 Claims, 8 Drawing Sheets

FAST DISPLAY OF IMAGES OF THREE-DIMENSIONAL SURFACES WITHOUT ALIASING

BACKGROUND OF THE INVENTION

1. Field of the Invention

The present invention relates to a system and method for the generation of images of three-dimensional surfaces on a computer graphics display. More specifically the present invention relates to generating such images without aliasing effects and without the need for special hardware.

2. Description of the Prior Art

Surface data typically consists of a two-dimensional array of values that represent surface heights. For example, this is the standard form of data in a digital terrain model. There are two main classes of techniques for generating an image of such a surface: polygon-based techniques and ray-tracing techniques. Polygon-based techniques divide the surface into shaded polygons, which are then projected to the display screen. Ray-tracing techniques trace rays from the display screen to their intersections with the surface. Ray-tracing techniques produce highly realistic images but, are very slow due to the computational burden of searching for ray-surface intersections. Polygon techniques, on the other hand, are much faster but, they are still slow due the problem of detecting and removing hidden portions of the surface.

Three techniques for hidden surface removal, which are well-known in the art, are the z-buffer (or depth buffer) method, the scan-line method and the depth-sorting method. The z-buffer method tests the visibility of surfaces one point at a time. For each pixel location on the display screen, the polygon that is closest to the screen and projects to that pixel is visible. Scan-line methods generalize this approach by testing the visibility of polygons for each horizontal or vertical scan line of the display screen. The screen is divided into horizontal or vertical lines, and as each line is processed, all polygons intersecting that line are examined to determine which are nearest to the screen. The depth sorting method, on the other hand, sons the polygons in order of nearness to the display screen. The polygons are then projected to the screen in order, beginning with the farthest polygon. The nearer polygons overwrite the farther ones, thereby obscuring them.

Although faster than ray-tracing techniques, polygon techniques are very slow when the surface has many polygons. A surface defined on a 1000×1000-element grid, for example, has one million square polygons. Fitting a fewer number of polygons to the surface speeds up the image generation process but, causes the loss of surface detail such as roughness and texture. To speed up the image generation process, many polygon techniques require specialized three-dimensional graphics hardware. Many workstations, personal computers, notebook computers, and personal digital assistants (PDA) however, do not have this specialized hardware. Furthermore, these algorithms generally suffer from aliasing effects due to pixel discretization, which results in jagged lines and edges.

To generate images of surfaces more quickly, a prior art technique has been developed that exploits the gridded structure of a surface to remove hidden surfaces more quickly. This technique is described in "Fast Perspective Views of Images Using One-Dimensional Operations" by P. K. Robertson in the February 1987 issue of IEEE Computer Graphics and Applications. This technique first resamples the surface so that the columns of the grid on which it is defined project to the vertical columns of pixels on the display screen. As a result, any surface point can be occluded only by other points in front of it in the same column. The image is then generated by projecting the surface points to the display screen from back to front, so that the nearer points overwrite the farther ones. Although this method is much faster than previous methods, it suffers from aliasing effects that are caused by pixels overwriting other pixels. For example, the boundary of a portion of the surface that occludes another portion of the surface will appear jagged. A tall, narrow peak will also appear jagged. In addition, if detailed image or texture data is overlaid on the surface, the overlaid image or texture will be severely degraded by the pixel overwriting.

There is a long-felt need in the art for a graphics display technique that can create images of three-dimensional surfaces in real time without aliasing effects. There is also a long-felt need to produce images on a workstation, PC, notebook computer, PDA or other computer system without the need for specialized three-dimensional graphics hardware.

SUMMARY OF THE INVENTION

The above-mentioned long-felt need has been met in accordance with the present invention by providing means for the quick generation of images of three-dimensional surfaces without aliasing effects. The invention is designed for use by a workstation, PC, notebook computer, PDA or other computer system without special three-dimensional graphics hardware.

It is an object of the invention to generate images in which an arbitrary grey-scale or color image has been overlaid on the surface without degrading the overlaid image due to aliasing effects.

It is a further object to allow a human user to view a digital terrain model with mathematical or textural data overlaid upon it.

It is another object of the invention to require no temporary work arrays other than a one-dimensional array of floating-point variables, the length of which is equal to the height in pixels of the display screen.

It is yet another object of the invention to create images in real time and without preprocessing steps or preliminary passes through the surface data, thus allowing a human user to observe the image as it is created.

In accordance with a preferred embodiment of the present invention, a system for displaying images of three-dimensional surfaces comprises a means for storing surface data in a two-dimensional array. The system also includes a means for retrieving elements of this surface data by specifying grid locations (i, j) and a means for performing floating-point arithmetic and comparison operations on this data. The system also includes means for inputting parameters from the user that define the viewer orientation with respect to the surface. The system also includes a one-dimensional floating-point array and various floating-point variables for storing results of intermediate calculations. Lastly, the system includes means for displaying pixels of specified grey-levels or colors on a rectangular display screen by specifying the grid location (i, j) of a pixel and its grey-level or color. An example of such a preferred embodiment is a graphics workstation such as the IBM RISC System/6000® or a PC, PDA or other computer system with graphics capability.

According to the invention, the foregoing objects are achieved as follows. The point of view of the display screen is specified by an azimuth angle and an elevation angle. The surface is defined as a two-dimensional array of height values, and the grey-level shades (or colors) are either defined in another two-dimensional array or computed as needed. The shade of the surface at an arbitrary point can be computed using a well-known technique in the art called Lambertian shading, which computes the shade as the dot product of the surface normal vector and a fixed vector that points toward the light source. The projection of a point of the surface to the display screen is performed by applying a rotation based on the azimuth and elevation angles, followed by a parallel projection to the display plane. Through resampling of the surface by the azimuth angle, it may be assumed that the azimuth angle is zero. In this case, the columns of the surface project to the columns of the display screen. This projection is monotonic in the sense that as one proceeds along a visible portion of the surface away from the display screen, the projected points proceed in an upward direction on the display screen. Depending on the steepness of the surface relative to the viewing angle, neighboring points of the surface may project to the same pixel, neighboring pixels or widely-separated pixels. The surface points are projected beginning with the nearest points and proceeding to the farthest points. The points are projected in pairs, and the grey-level shading (or color) values are accumulated in a one-dimensional array of floating-point variables that store the intensities of the pixels of a column of the display screen. The intensities are accumulated by weighting the grey-level shades (or colors) by the distance between the projected pair of points and by the fractional offsets from the integer-valued pixel locations. Because the grey-level shade of every grid point of the surface contributes to the pixel intensities, aliasing effects within columns of pixels are avoided. Aliasing effects across columns are avoided by the use of intermediate scan lines between the columns of pixels.

Hidden portions of the surface are detected by keeping track of the current maximum value of the projected points in each column. Hidden surface removal is thus reduced to a simple comparison: if a newly projected point is less than the current maximum value, it is not visible. To avoid aliasing effects at the boundaries of occluding surfaces, the following procedure is performed for each pair of projected points: if one projected point is less than the current maximum while the other is greater, then the former point's projected value is changed to the current maximum value.

The grey-level or color shading of the surface can be computed as needed or pre-computed and stored in a two-dimensional array. Any grey-level or color image can be stored in this array, thereby resulting in the generation of an image of the three-dimensional surface with the given image overlaid upon it. Because of the lack of aliasing effects, the overlaid image will not be degraded.

Because the image of the three-dimensional surface is generated in one-pass without the need for preprocessing steps, and because it is generated by scanlines (vertical columns) which are independent of one another, the image can be displayed line by line as each scanline is completed. This produces a scanning effect during the generation of the image that can be observed by a human user, making this system suitable for interactive use.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE INVENTION

Figure 10:
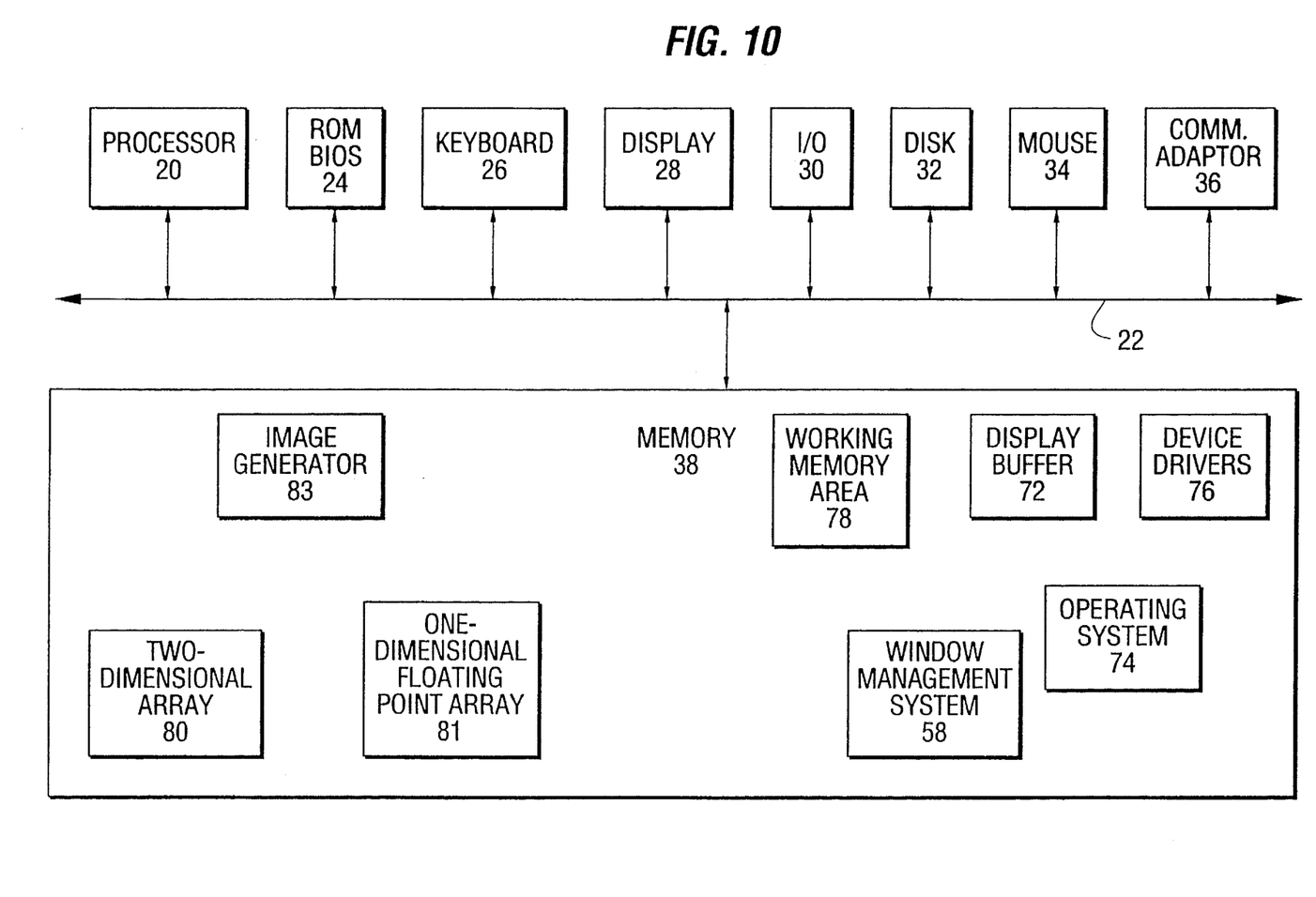
FIG. 10 is a block diagram of the preferred embodiment for a system for displaying images of three-dimensional surfaces.

The preferred embodiment of this invention comprises a set of computer programs for the generation of images of three-dimensional surfaces as shown in the architectural block diagram of FIG 10. FIG. 10 includes a processor 20 connected by means of a system bus 22 to a read only memory (ROM) 24 and memory 38. Also included in the computer system in FIG. 10 are a display 28 by which the computer presents information to the user, and a plurality of input devices including a keyboard 26, mouse 34 and other devices that may be attached via input/output port 30. Other input devices such as other pointing devices or a voice sensors or image sensors may also be attached. Other pointing devices include tablets, numeric keypads, touch screen, touch screen overlays, track balls, joy sticks, light pens, thumb wheels etc. The I/O 30 can be connected to communications lines, disk storage, input devices, output devices or other I/O equipment. The memory 38 includes a display buffer 72 that contains pixel intensity values for a display screen. The display 28 periodically reads the pixel values from the display buffer 72 displaying these values onto a display screen. The pixel intensity values may represent grey-levels or colors.

The memory 38 includes a two-dimensional array 80, a one-dimensional floating point array 81, and an image generator (IG) 83. The two-dimensional array 80 contains values that may have been sampled from a two-dimensional function that has been projected onto the two dimensional array. The values in the two-dimensional array may represent surface data, terrain data, heights, meteorological data, data generated from a scanning tunnel microscopy, medical imaging data or other information. The one-dimensional floating point array 81 is an array having an index that represents pixel locations for a column or a portion of a column of the display buffer 72. Thus, the one-dimensional array has integer-valued pixel locations for storing pixel intensity values. The array contains floating point numbers that represent pixel intensity values for the pixel location at which the intensity values is stored. The pixel intensity values can represent grey level shades or colors. Typically the display buffer 72 contains integer-only pixel intensity values so that before writing pixel intensity values from the one-dimensional floating point array 81 to the display buffer 72 a rounding or truncating operation may need to be performed. A mapping or normalization operation may also be performed when the pixel intensity values are written from the one-dimensional floating point array 81 to the display buffer.

The IG 83 application causes an image to be written to the display buffer 72 or a portion of the display buffer 72 (e.g., a window or a viewport). Given an orientation of a display plane with respect to a three-dimensional surface the IG 83 writes an anti-aliased image to the display buffer 72. The IG 83 can write directly to the display buffer 72 or via the operating system 74 or via window management system 58. Examples of operating systems include AIX®, OS/2®, and DOS. Examples of window management systems are the X Window System® for AIX®, Presentation Manager™ for OS/2® and WINDOWS™ for DOS. The IG 83 is a collection of functions. These functions are explained in detail below.

Other elements shown in memory 38 include drivers 76 which interpret the electrical signals generated by devices such as the keyboard and mouse. A working memory area 78 is also shown in memory 38. The working memory area 78 can be utilized by any of the elements shown in memory 38. The working memory area can be utilized by the IG 83, window management system 58, the operating system 74 and other functions. The working memory area 78 may be partitioned amongst the elements and within an element. The working memory area 78 may be utilized for communication, buffering, temporary storage, or storage of data while a program is running.

Figure 1:
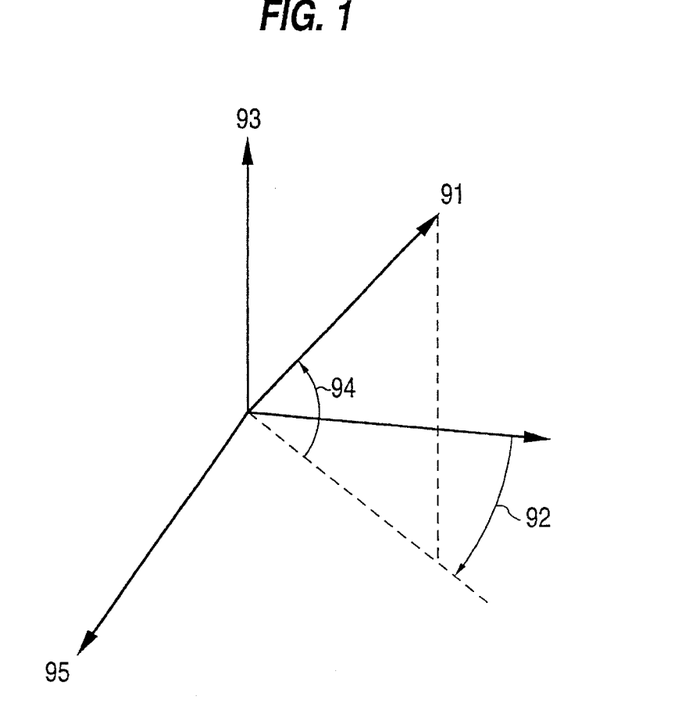
FIG. 1 is an illustration of the azimuth and elevation angles which define the point of view of the display screen or the orientation of the display plane.
Figure 2:
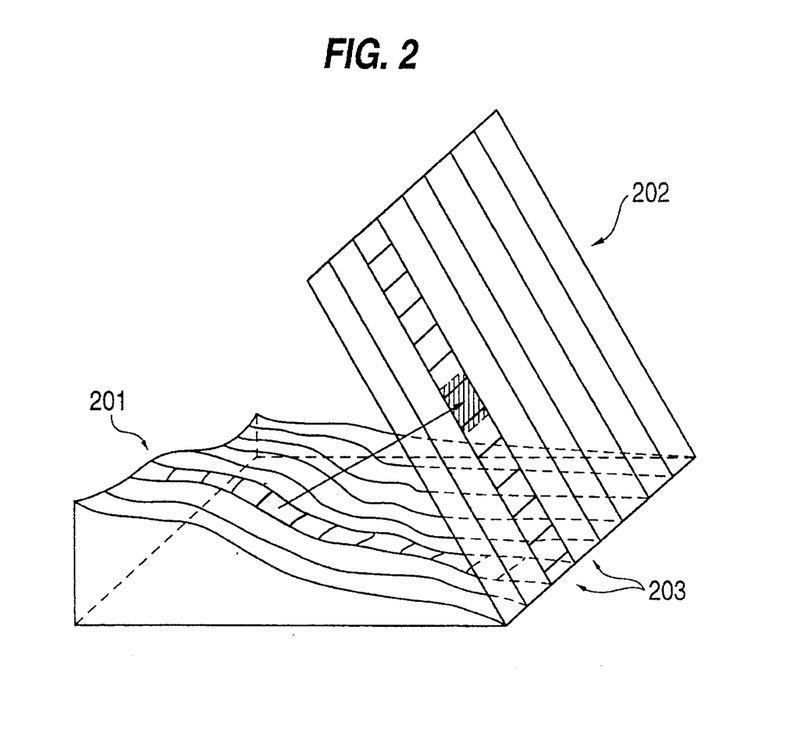
FIG. 2 is a graphical representation of the projection of columns of the gridded surface to columns of the display screen.

As stated previously the IG 83 functions to create that creates an anti-aliased image of a three-dimensional surface. The functions of the IG 83 will now be described in detail. The IG 83 creates an image by projecting surface points to the display buffer for display on the display screen. This projection technique will be described with reference to FIGS. 1 to 5. The projection technique used to display a three-dimensional surface is referred to as the parallel (or orthographic) projection. The parallel projection projects points from the surface to the display screen (represented by the display plane) along lines which are parallel to one another and perpendicular to the display plane. This projection can be performed by rotating the surface points according to a specified point of view and projecting to the x-y plane (which represents the display plane) according to the natural projection function $p(x, y, z)=(x, y)$. FIG. 1 illustrates how the point of view 91 is specified by an azimuth angle 92, which is a rotation of the surface about a vertical axis 93 that passes through the center of the surface, and an elevation angle 94, which is a rotation of the surface about a horizontal axis 95 that passes through the surface and is parallel to the display plane. If the azimuth angle is zero then points of the surface which lie on a column of the array onto which the surface is defined, are projected to a single column of pixels on the display plane and thus the display screen. This is illustrated in FIG. 2, which shows the surface 201, the display plane 202 and the columns of the surface aligned with the columns 203 of the display plane 202. A prior art technique, which is described in the paper by P. K. Robertson mentioned above, performs a preprocessing step that resamples the surface into a second two-dimensional array according to a planar rotation defined by the azimuth angle. This prior technique effectively rotates the surface array so that the azimuth angle may be regarded as zero, and therefore the columns of the surface grid are aligned with the columns of the display plane. The present invention avoids this preprocessing step by resampling the surface on a point-by-point basis as the surface points are needed. The present invention only resamples points of the surface array that fall within the view of the display plane. Thus the present invention removes the need for a second array in which to store the resampled surface. The point-by-point resampling also reduces the number of surface points that need to be resampled which results in a computational savings especially where large surface arrays are used.

Figure 3:
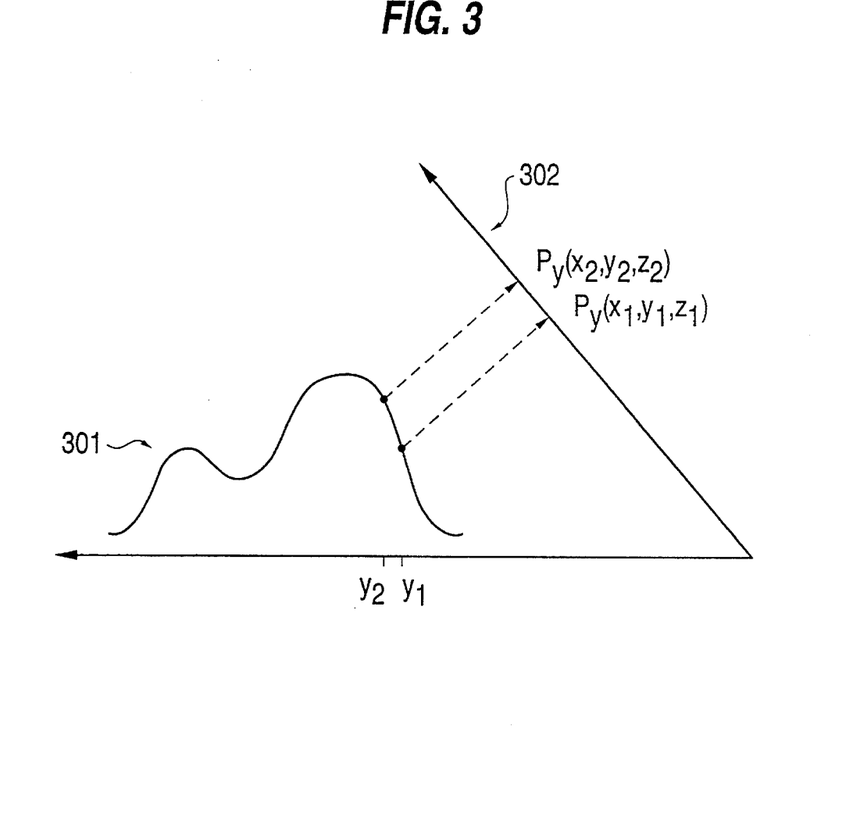
FIG. 3 is a graphical illustration of the monotonic projection of points from the surface to the display screen.

FIG. 3 shows that the parallel projection of the points of the surface 301 to the display plane 302 (i.e., representing the display screen) is monotonic. This signifies that as one proceeds along a column of visible surface points in a direction away from the display plane, the projected points proceed along the display plane in an upward direction. In mathematical terms, let $P_y$ denote the y (or vertical) component of the projection function. If $(x_1, y_1, z_1)$ and $(x_2, y_2, z_2)$ are two surface points such that $x_1 = x_2$ (i.e., the points lie in the same column) and $y_1 \leq y_2$, then the projected points satisfy the relation $P_y(x_1, y_1, z_1) \leq P_y(x_2, y_2, z_2)$.

Figure 4:
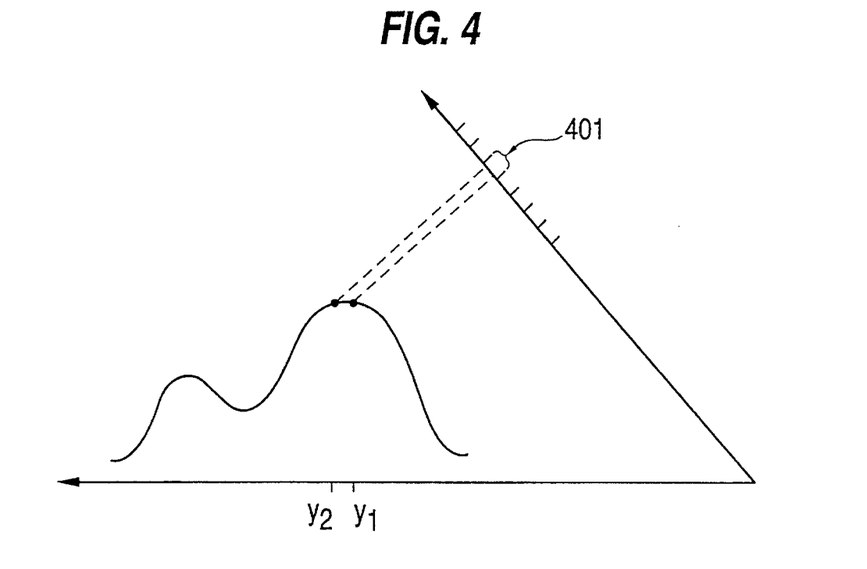
FIG. 4 is a graphical illustration of neighboring points on the surface which project to the same pixel of the display screen.
Figure 5:
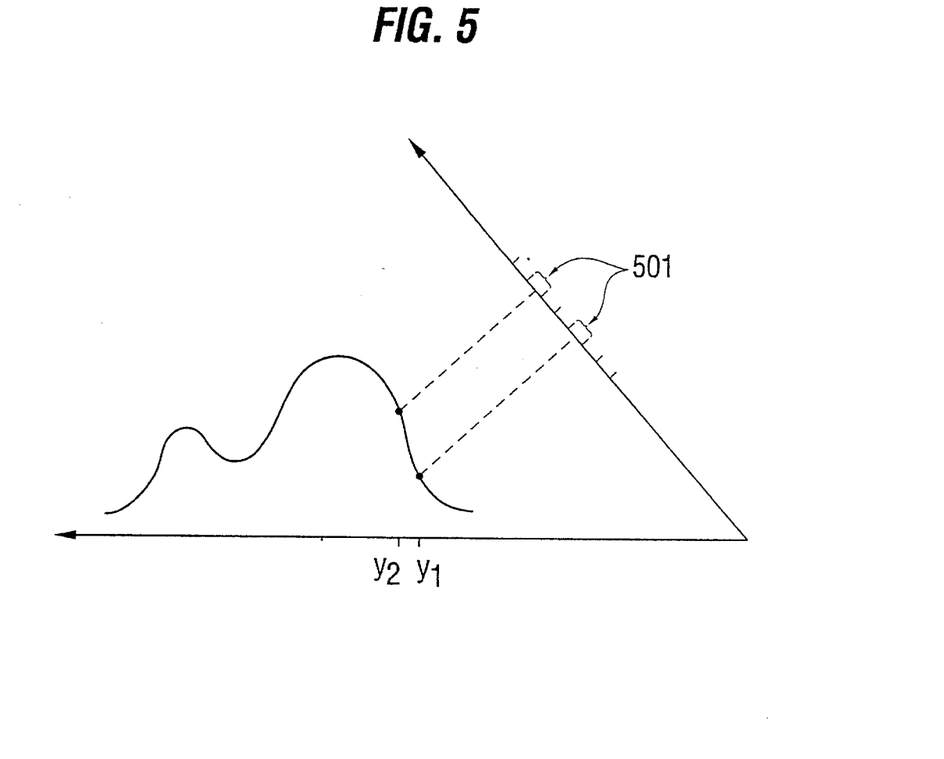
FIG. 5 is a graphical illustration of neighboring points in the surface which project to widely-separated pixels on the display screen.

FIG. 4 shows that neighboring points of the surface may project to the same pixel 401 of the display plane. Since the pixels are spaced one unit apart, this signifies that when the fractional portions of the projected points $P_y(x_1, y_1, z_1)$ and $P_y(x_2, y_2, z_2)$ are truncated, they result in the same integer (i.e., the same pixel). Neighboring points may also project to distinct pixels, and FIG. 5 illustrates that they may even project to widely separated pixels 501.

The prior art technique mentioned above (and described in the aforementioned paper by P. K. Robertson) projects surface points to the display screen starting with the farthest point and proceeding to the nearest point. If two points project to the same pixel, the nearer one will overwrite the farther one. Interpolation is used only if the points project to widely separated pixels, in which case the grey-level (or color) values of the pixels in between are interpolated. However, this prior art technique leads to aliasing errors due to the overwriting of pixels, especially at occluding boundaries where they are very noticeable to a human observer. The present invention takes advantage of the monotonicity of the projection to avoid these aliasing effects.

The present invention avoids aliasing effects by the use of the following technique. Rather than proceeding along the surface from the farthest points to the nearest points as in the prior art, the present invention begins with the nearest point and proceeds to the farthest point. Each point $(x, y, z_1)$, where $(x, y)$ is an integer grid location and $z_1$ is the height of the surface at that location, is projected along with the preceding point $(x, y-1, z_2)$. A one-dimensional array of floating-point variables is used to accumulate weighted grey-level shades (or colors) from the points. The weights are calculated by use of the distance between the projected pair of points and by use of the fractional offsets from the integer-valued pixel locations. Let $p_1$ and $p_2$ be the y-components of the projections of the points, and let square brackets denote the operation of truncation to the largest integer that does not exceed the given number. (For example, $[3.2]=[3.9]=3$).

There are three possible cases:

Case 1: $p_1 \leq p_2$

Case 2: $p_1 > p_2$ and $[p_1] = [p_2]$

Case 3: $p_1 > p_2$ and $[p_1] > [p_2]$

Figure 6A:
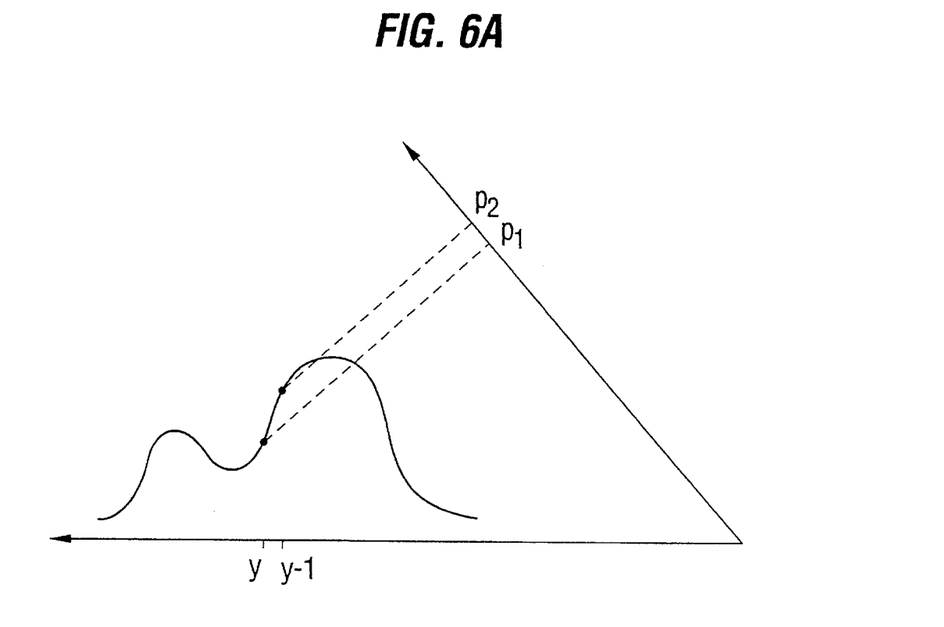
FIGS. 6A to 6C are graphical illustrations of the accumulation of weighted grey-scale values.
Figure 6B:
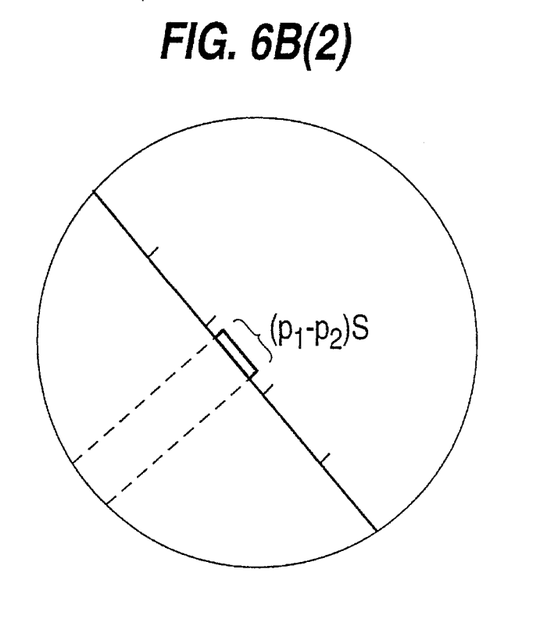
Figure 6C:
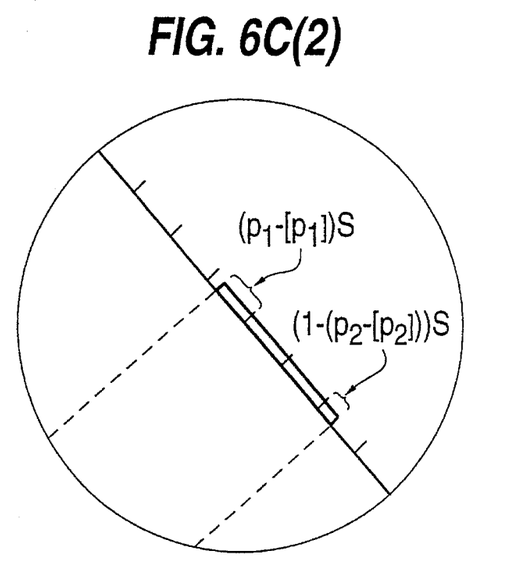

In case 1, which is illustrated in FIG. 6A, both points lie on a portion of the surface that is facing away from the display plane and is therefore not visible. In case 2, the points project to the same pixel as shown in FIG. 6B, and therefore the value $(p_1-p_2)S$ is added to element $[p_1]$ of the one-dimensional array. S denotes the grey-level shade (or color) of the surface at the grid point (x, y). In case 3, which is illustrated in FIG. 6C, the points project to distinct pixels. In this case, the value $(1-(p_2-[p_2]))S$ is added to element $[p_2]$ of the one-dimensional array, and $(p_1-[p_1])S$ is added to element $[p_1]$. In addition, the value S is added to elements $[p_2]+1$ through $[p_1]-1$ (i.e., the pixels in between $[p_2]$ and $[p_1]$). Alternatively, the shading value to be added to elements $[p_2]+1$ through $[p_1]-1$ may be calculated by linear interpolation of the shades of the surface at the two grid points (x,y) and (x,y−1).

After all the points in a column have been projected, the values of the one-dimensional array are rounded to pixel intensities and written to the display buffer and displayed on the graphics screen. The pixel intensities can also be stored in a separate two-dimensional array until all the columns have been processed. Although storing the pixel values in a separate array until all columns have been processed requires an additional array it allows the screen to be updated with the entire image at one time. The present invention can be utilized with this double buffering technique. Because every grid point of the surface contributes to the pixel intensities, aliasing effects within columns are avoided.

It should be noted that the grey-level or color shading of the surface can be computed as needed or pre-computed and stored in another two-dimensional array. Any grey-level or color image can be stored in this array. This capability enables the generation of an image of the three-dimensional surface with the given image overlaid upon it. Because of the lack of aliasing effects, the overlaid image will not be degraded. The technique works with almost any shading technique including Lambert cosine shading and Phong specular reflection, shadowing, coloring and refracted light effects. These and other techniques suitable for use with the present invention are described in Computer Graphics Principles and Practice, Second Edition, 1990, by Foley el. al. which is hereby incorporated by reference.

The IG can reduce aliasing effects across the columns by the use of intermediate scanlines. Given a number n of intermediate scanlines, for each scanline k, where $0 \leq k < n$, the surface points of the form (x+k/n, y, z) are projected. The grid column is specified by the integer x, and the grid point within the column is specified by the integer y. The height z of the surface at the point (x+k/n, y) is determined by interpolation. The weighted grey-level shades are multiplied by 1/n before being added to the one-dimensional array, and the array is converted to pixel values only after the last intermediate scanline (i.e., k=n−1) has been processed. Typically, two or three intermediate scan lines are sufficient to remove aliasing effects.

Figure 7:
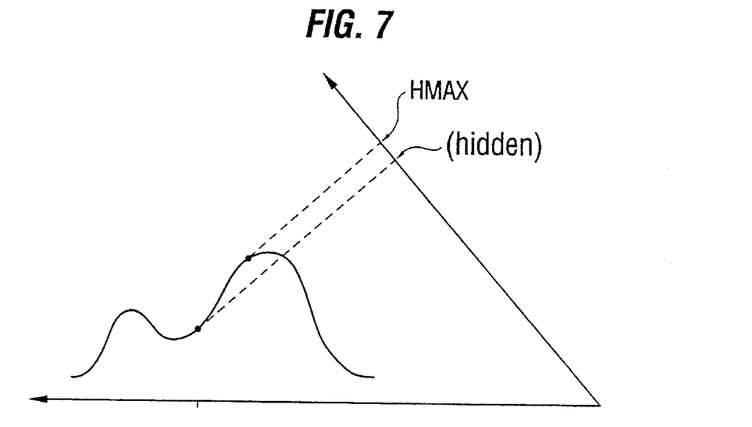
FIG. 7 is a graphical illustration of the projection of hidden points of the surface to points on the display screen that are less than the current maximum value of projected points.
Figure 8A:
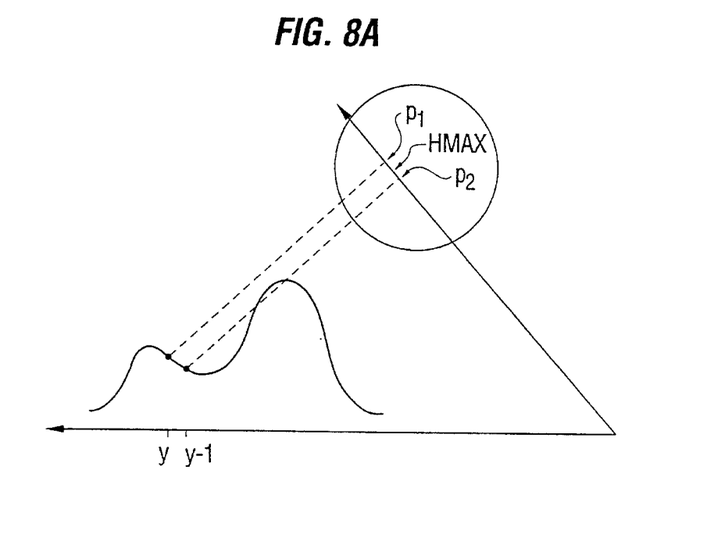
FIG. 8 is a graphical illustration of the accumulation of grey-scale shades at occluding boundaries of the surface to avoid aliasing errors.
Figure 8B:
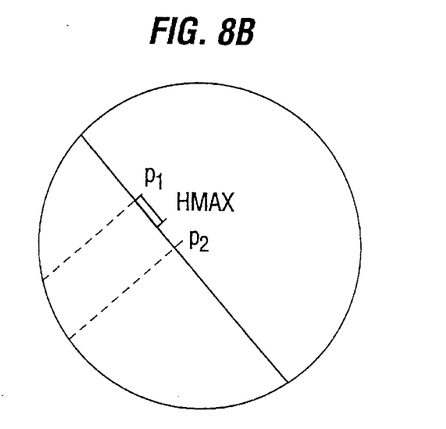

Hidden surface removal is accomplished as follows. A floating-point variable denoted HMAX, which must be initialized to zero before processing each column, maintains the current maximum value of the projected points. Any point that projects to a value greater than HMAX is visible, while a point that projects to a lesser value is hidden as illustrated in FIG. 7. If the projected point $p_2$ is less than HMAX, it is set equal to HMAX as shown in FIG. 8 before the processing of one of the three possible cases described above is performed. After the processing is completed, HMAX is updated to the value of the point $p_1$ if it was visible. In this way, hidden portions of the surface are not permitted to contribute grey-level shading to the one-dimensional array. The visible portions of the surface between pairs of projected points do contribute to the grey-level shading, however, and this prevents aliasing effects at the boundaries of occluding surfaces.

Figure 9:
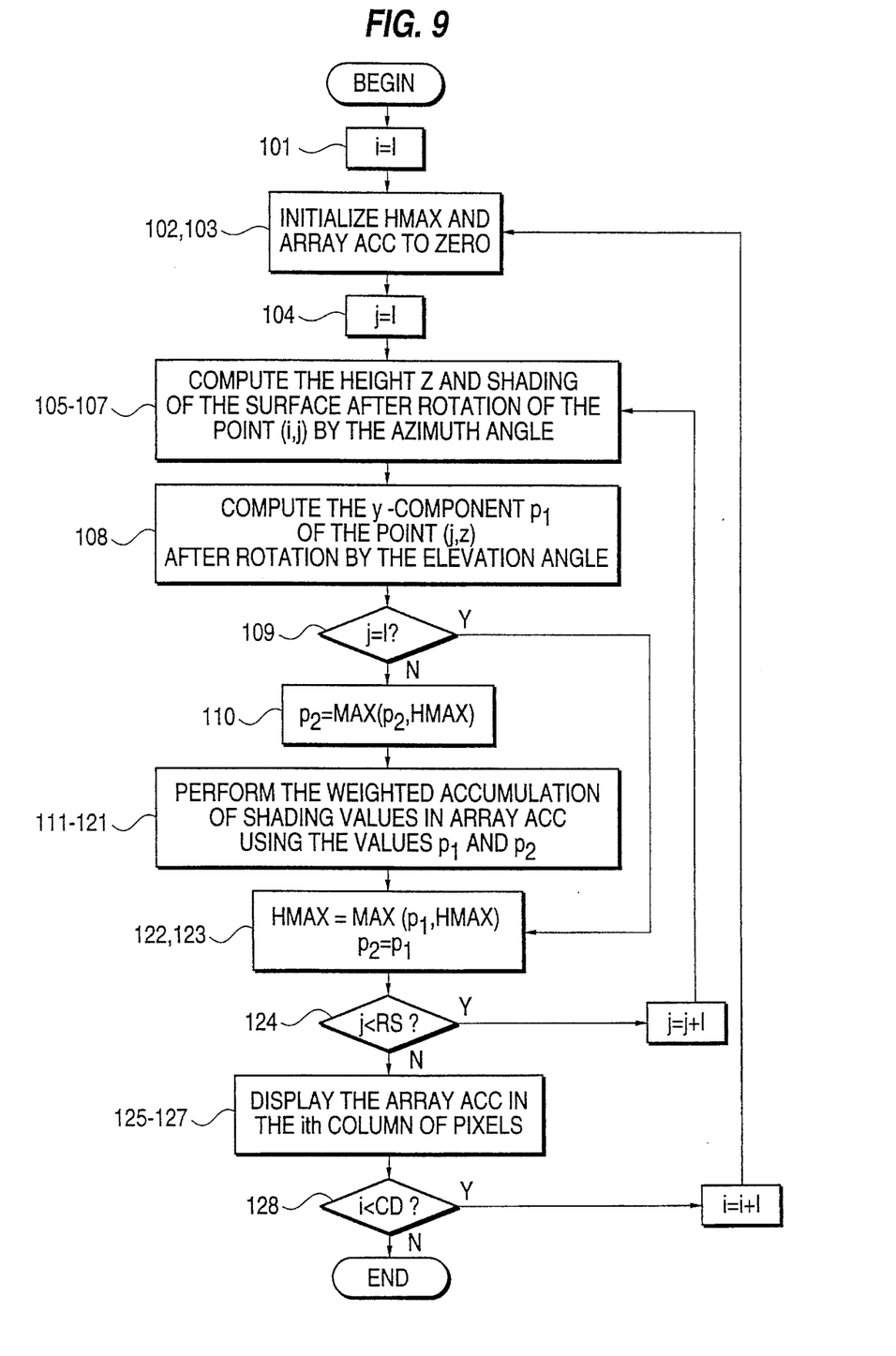
FIG. 9 is a flow diagram showing one embodiment of the present invention.

An embodiment of the present invention is given as a flow diagram in FIG. 9. A pseudocode listing is given in Table I along with line numbers that are keyed to the blocks of the flow diagram of FIG. 9. A description is provided below with reference to the pseudocode of Table I. The display plane (i.e., screen) is assumed to be RD×CD pixels in size, where RD is the number of rows and CD is the number of columns. The surface is defined in an array of size RS×CS. The floating-point array ACC is of length RD and accumulates the grey-level values for each column of pixels. The floating-point variable HMAX, which is needed for the hidden surface removal, stores the current maximum of the points projected to the display plane. The variable SHADE stores the grey-level shade of the current point on the surface.

The embodiment shown in Table I loops through the columns of the display screen from left to right (see line 101) as a user would view the screen. The psuedocode can easily be modified to provide looping from right to left or from the center out to the edges or interlacing. Thus, the columns may be processed in any order.

The projection of points from the surface to the display plane is performed in lines 105–108. Line 105 performs the point-by-point resampling of the surface by the azimuth angle. This resampling is defined by the plane rotation $$a = i*\text{cosine}(az) + j*\text{sine}(az) \text{ and}$$

$$b = -i*\text{sine}(az) + j*\text{cosine}(az),$$

where az is the azimuth angle.

Line 106 calculates the height of the surface at the new point by bilinear interpolation. Line 107 determines the shade of the surface at the new point. Line 108 performs the rotation by the elevation angle. Since the surface columns are conceptually aligned with the display columns, this is a plane rotation. The height of the projected point on the display plane is thus defined by $$p_1 = j*\text{cosine}(el) + z*\text{sine}(el),$$

where el is the elevation angle.

Note that the value q defined by the rotation is not needed. Similarly, the value $p_2$ defined in line 123 is the height of the projection of the preceding point. Although the above described resampling utilized a bilinear interpolation, other interpolation techniques (i.e., nearest neighbor or bicubic or others) can be used by the present invention. Persons of ordinary skill in the art can modify the above described embodiment to use these other interpolation techniques.

The hidden surface removal is accomplished in lines 110 and 122. The weighted accumulation of grey-level values is performed in lines 113–121. The grey-level pixel values for a column are written to the display buffer by lines 125–127.

For simplicity, the processing of intermediate scan lines has been omitted from the embodiment given in Table I and FIG. 9. However, those of ordinary skill in the art will have no difficulty incorporating it. For example, a third loop can be inserted between lines 102 and 103 to loop over the intermediate scan lines. In line 105 the variable i must be replaced with i+k/s, where k is the current intermediate scan line number and s is the number of intermediate scan lines. In addition, the value of SHADE computed in line 107 must be multiplied by 1/s.

The orientation of the display plane with respect to the surface may also be controlled interactively by a user via the input devices. The IG 83 or another application can translate the user's action(s) into a new display plane orientation. This input could simply consist of using the keyboard to input an elevation and azimuth angle. Many other techniques are available such as using slider bars to define the angles or a graphical compass or by positioning a rectangle representing the display plane over a wire frame model of the surface. These as well as many other techniques can utilized to allow the user to interactively select the desired view. A preferred technique is to display a wire frame model of the surface which allows the user to view the wire frame from the currently selected orientation. The user then adjusts the orientation to the desired orientation using the wire frame as shown on the display. When the user has the desired orientation a selection is made to start the anti-aliasing operation so that the wire frame model is shaded accordingly. This provides an effective interactive technique for obtaining the desired image.

Those skilled in the art will also have no difficulty adding other enhancements. For example, a zoom function can be easily incorporated that allows the generation of images of enlarged portions of the surface. If (c,d) is the grid point specifying the center of the surface portion to enlarge, and if r is the magnifying factor (where r=–1 denotes no enlargement and r=–2 denotes doubling the size, for example) then (a,b) must be replaced with (1/r) [(a,b)–(c,d)]+(c,d) immediately after line 105 of the pseudocode of Table I.

Those skilled in the art will also have little difficulty incorporating other methods for performing the weighted accumulation of grey-level values. The following method is a more precise method but requires more computations. Let $S_1$ be the shade of the surface at the grid point (x, y), and let $S_2$ be the shade at (x, y–1). Let $p_1$ and $p_2$ be the y-components of the projections of the points. In case 2 of the three possible cases described above, the value $(P_x-p_2)S$ should be added to element $[p_1]$ of the one-dimensional array, where $S=(S_1+S_2)/2$ is the average shade. In case 3, define $$w=(S_1-S_2)/(p_1-p_2),$$

$$q_1=p_1-\lfloor p_1 \rfloor \text{ and}$$

$$q_2=1-(p_2-\lfloor p_2 \rfloor).$$

Then the value $$q_1(S_2+w(\tfrac{1}{2}(p_1+\lfloor p_1\rfloor)-p_2))$$

should be added to element $[p_1]$ of the array, and the value $$q_2(S_2+w(\tfrac{1}{2}(p_2+\lfloor p_2\rfloor+1)-p_2))$$

should be added to element $[p_2]$. In addition, for each integer k from $[p_2]+1$ to $[p_2]-1$, the value $S_2+w(k-p_2)$ should be added to element k of the array.

TABLE I

```
101  LOOP for i = 1 to CD (* Loop over the columns of the
         display screen *)
102      Let ACC_j = 0 for j=1 to RD.
103      Let HMAX = 0.
104      LOOP for j=1 to RS (* Loop over the surface points
             within the column *)
105          Let (a,b) be the image of the point (i,j) after a plane
                 rotation by the azimuth angle.
106          Let z be the height of the surface at the point (a,b).
107          Let SHADE be the grey-level shading of the surface
                 at the point (a,b).
108          Let (q,p_1) be the image of the point (j,z) after a plane
                 rotation by the elevation angel.
109          IF j=1 THEN GOTO 122 (* Skip to the next
                 iteration *)
110          Let p_2 = MAX(p_2, HMAX).
111          Let m be the largest integer not exceeding p_1.
112          Let n be the largest integer not exceeding pp_2.
113          IF p_1 > p_2 THEN
114              IF m = n THEN
115                  Let ACC_m = ACC_m + (p_1 – p_2)*SHADE.
116              ELSE
117                  Let ACC_m = ACC_m + (p_1 – m)*SHADE.
118                  Let ACC_n = ACC_n + (1 – (p_2 – n))*SHADE.
119                  Let ACC_k = ACC_k + SHADE for k = n+1
                         to m–1.
120              END IF
121          END IF
122          Let HMAX = MAX(p_1, HMAX).
123          Let p_2 = p_1
124      END LOOP
125      LOOP for j = 1 to RD
126          Display the grey-level pixel value ACC_j at pixel
                 location (i,j) on the display screen.
127      END LOOP
128  END LOOP
```

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. In a computer system having a processor, a memory, a display means interconnected by a system bus, the computer system also having a two-dimensional array in the memory representing a three-dimensional surface, a display plane having a plurality of columns, each column having a plurality of pixels, where the orientation of the display plane with respect to the three-dimensional surface is defined by an elevation angle and an azimuth angle; a grid formed by a plurality of parallel columns, each column having a plurality of grid points, the grid oriented such that the columns of the grid project to columns of the display plane, the grid and display plane separated by the elevation angle; a one-dimensional floating-point array having integer valued pixel locations for storing pixel intensity values for a column of the display plane; the display means for displaying pixels of specified intensities on a display screen, where the intensities are stored in a display buffer; a method of displaying images of the three-dimensional surface by performing the following steps for each column in the grid:

(a) accumulating intensity values in the one-dimensional floating point array by first initializing the one-dimensional floating point array and then for all grid points of the column, starting with the grid point nearest the display plane and proceeding towards points further from the display plane, performing the following steps:

(1) determining a current projection position along the column at an accuracy better than one pixel position and a corresponding shading value by resampling the three dimensional surface at the grid point and projecting the resampled grid point to the display plane in a direction perpendicular to the display plane;

(2) obtaining a previous projection position corresponding to the immediately preceding grid point and if the current projection position is not greater than any previous projection positions for the column at an accuracy better than one pixel position then assigning as the projection position for the current grid point the highest previous projection position;

(3) proceeding to the next grid point if the current projection position along the column is not greater than any previous projection positions for the column at an accuracy better than one pixel position;

(4) mapping the current projection position and the previous projection position to pixel locations in the one-dimensional floating-point array;

(5) adding intensity values to the one-dimensional floating-point array by weighting the shading value of the surface for the current grid point, by the distance from the current projection position and the previous projection position to adjacent integer valued pixel locations;

wherein the step of adding the intensity values is accomplished by adding intensity values to the one-dimensional floating point array such that if the current projection position is less than the previous projection position then no intensity values are accumulated; if the current projection position and the previous projection position map to the same pixel then accumulating the shading value of the surface for the grid point to the pixel location of the one-dimensional floating point array weighted by the difference between the current projection position and the previous projection position; if the current projection position and previous projection position map to different pixels then accumulating the shading value of the surface for the grid point to the pixel location of the one-dimensional floating point array that the previous projection position maps to weighted by one minus a fractional offset and accumulating the shading value of the surface for the grid point to the pixel location of the one-dimensional floating point array that the current projection position maps to weighted by the fraction offset and accumulating the shading value of the surface for the grid point to the one-dimensional floating point array for any pixel locations that lie between the pixel location that the previous projection position maps to and the pixel location that the current projection position maps to; and (b) writing said accumulated values to the display buffer for display by the display means.

2. The method of claim 1 wherein before writing said accumulated values to the display buffer, performing the following step:

accumulating in the one-dimensional floating point array intensity values for more than one column of grid points to further anti-alias the intensity values accumulated in the dimensional floating point array.

3. The method of claim 1 where the shading value of the surface for the grid point is computed using a shading function.

4. The method of claim 1 where the shading value of the surface for the grid point is read from a two-dimensional shading value array.

5. The method of claim 4 wherein the two dimensional shading value array contains an image to be overlaid on the three dimensional surface.

6. The method of claim 1 where the pixel intensities represent grey levels.

7. The method of claim 1 where the pixel intensities represent colors.

8. The method of claim 1 where the resampling uses bilinear interpolation.

9. The method of claim 1 where the columns are processed from left to right across the display plane.

10. The method of claim 1 where the columns are processed from the middle of the grid out to the left and right edge of the display plane.

11. The method of claim 1 wherein the orientation of the display plane with respect to the three-dimensional surface is interactively defined by a user.

12. A computer system for rendering antialiased images of a three-dimensional surface comprising:

a two-dimensional array in a memory means for storing a representation of the three-dimensional surface;

a display plane having a plurality of parallel columns, each column having a plurality of pixels, where the orientation of the display plane with respect to the three-dimensional surface is defined by an elevation angle and an azimuth angle;

a grid formed by a plurality of columns, each column consisting of a plurality of grid points, the grid oriented such that the columns of the grid project to columns of the display plane, the grid and display plane separated by the elevation angle;

a one-dimensional floating-point array having integer valued pixel locations for storing pixel intensity values for a column of the display plane;

a display means for displaying pixels of specified intensities on a display screen, where the intensities are stored in a display buffer;

an accumulation means that for all grid points of a column, starting with the grid point nearest the display plane and proceeding towards points further from the display plane, the accumulation means determines a current projection position at an accuracy better than one pixel position and a corresponding shading value by resampling the two dimensional array by the azimuth angle at the grid point and projecting the resampled grid point to the display plane, where the accumulation means determines a previous projection position from the immediately preceding grid point and if the current projection position is not greater than all previous projection positions for the column at an accuracy better than one pixel position assigns as the current projection position the highest previous projection position, the accumulation means proceeds to the next grid point if the current projection position is not greater than all previous projection positions for the column at an accuracy better than one pixel position, the accumulation means then maps the current projection position and the previous projection position to pixel locations in the one-dimensional floating-point array and adds intensity values to the one-dimensional floating-point array by weighting the shading value of the surface for the current grid point by the distance from the current projection position and the previous projection position to adjacent integer valued pixel locations;

wherein the accumulation means adds the intensity values to the one-dimensional floating point array such that if the current projection position is less than the previous projection position then no intensity values are added; if the current projection position and the previous projection position map to the same pixel location then adding the shading value of the surface for the grid point to the pixel location weighted by the difference between the current projection position and the previous projection position; if the current projection position and previous projection position map to different pixels then adding the shading value of the surface for the grid point to the pixel location that the previous projection position maps to weighted by one minus a fractional offset and adding the shading value of the surface for the grid point to the pixel location of the one-dimensional floating point array that the current projection position maps to weighted by the fraction offset and adding the shading value to any pixel locations that lie between the pixel location that the previous projection position maps to and the pixel location that the current projection position maps to; and     a rendering means for determining the pixel intensity values for all columns in the grid whereby for each column in the grid the rendering means initializes the one-dimensional floating point array, invokes the accumulation means and writes the accumulated values to the display buffer whereby the display means displays the pixels on the display screen.

13. The system of claim 12 wherein the rendering means accumulates intensity values in the one-dimensional floating point array for more than one column of grid points to further anti-alias the intensity values in the one-dimensional floating point array before writing the intensity values to the display buffer.

14. The system of claim 12 wherein the shading value of the surface for the grid point is computed using a shading function.

15. The system of claim 12 wherein the shading value of the surface for the grid point is read from a two-dimensional shading value array.

16. The system of claim 15 wherein the two dimensional shading value array contains an image to be overlaid on the three dimensional surface.

17. The system of claim 12 wherein the pixel intensities represent grey levels.

18. The system claim 12 wherein the pixel intensities represent colors.

19. The system of claim 12 wherein the accumulation means uses bi-linear interpolation to resample.

20. The system of claim 12 wherein the rendering means determines the pixel intensity values of columns from left to right across the display plane.

21. The system of claim 12 wherein the rendering means determines the pixel intensity values of columns from the middle of the grid out to the left and right edge of the display plane.

22. The system of claim 12 further comprising an interactive means wherein the orientation of the display plane with respect to the three-dimensional surface is interactively defined by a user.

* * * * *